Dec. 22, 1953  W. M. GALLOWAY  2,663,381
COTTON GIN TRASH DISPOSAL UNIT
Filed July 7, 1952  2 Sheets-Sheet 1
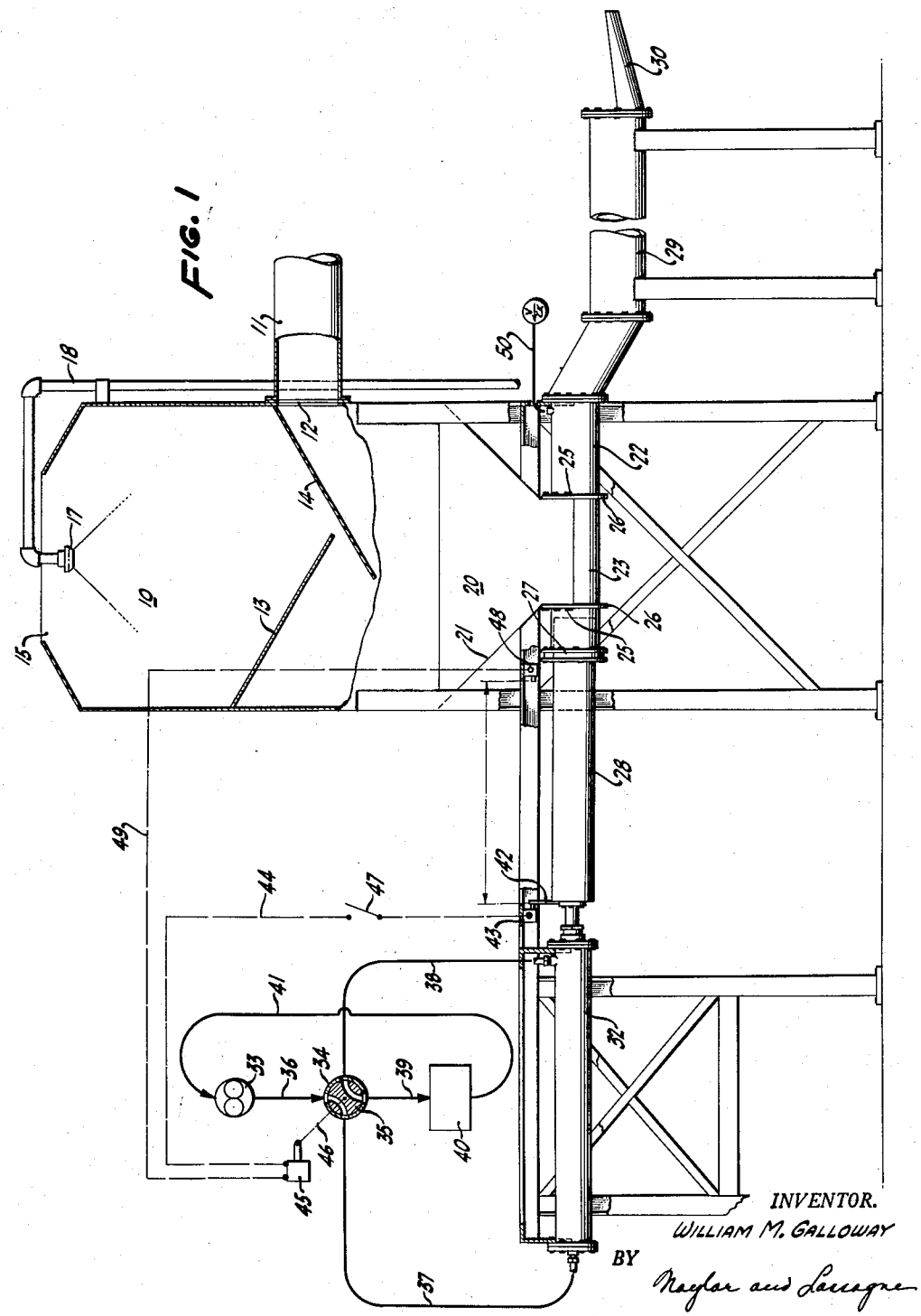
INVENTOR.
WILLIAM M. GALLOWAY
BY
Naylor and Lavagne
ATTORNEYS Dec. 22, 1953 W. M. GALLOWAY 2,663,381
COTTON GIN TRASH DISPOSAL UNIT
Filed July 7, 1952 2 Sheets-Sheet 2
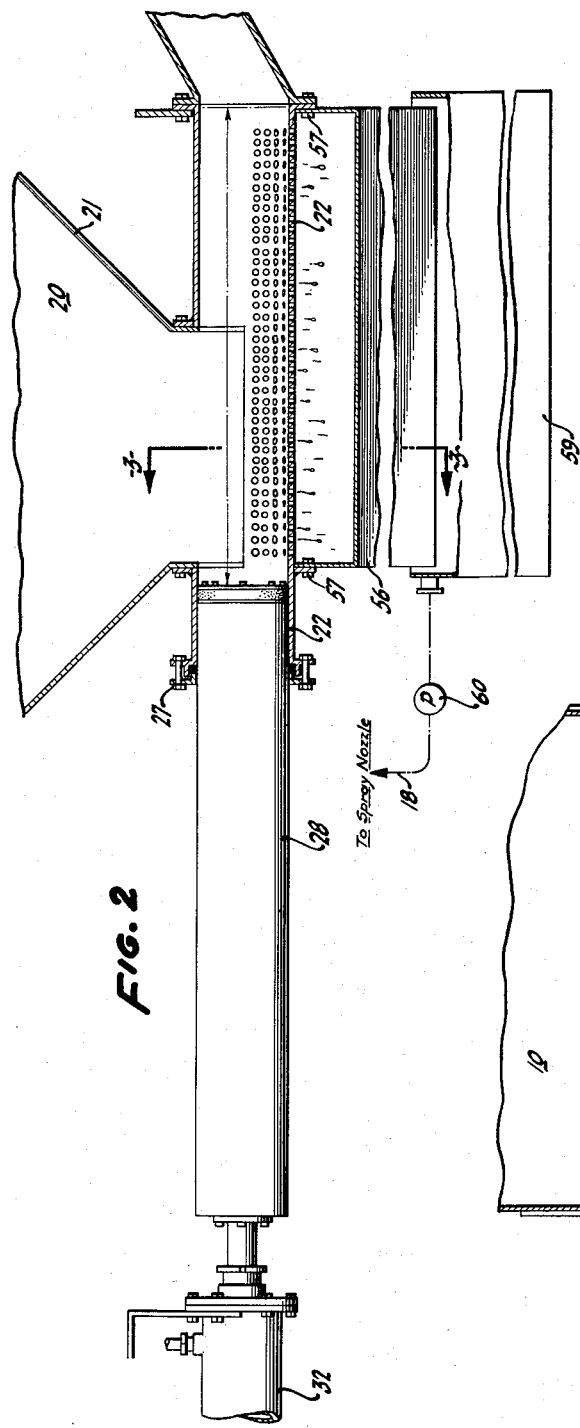
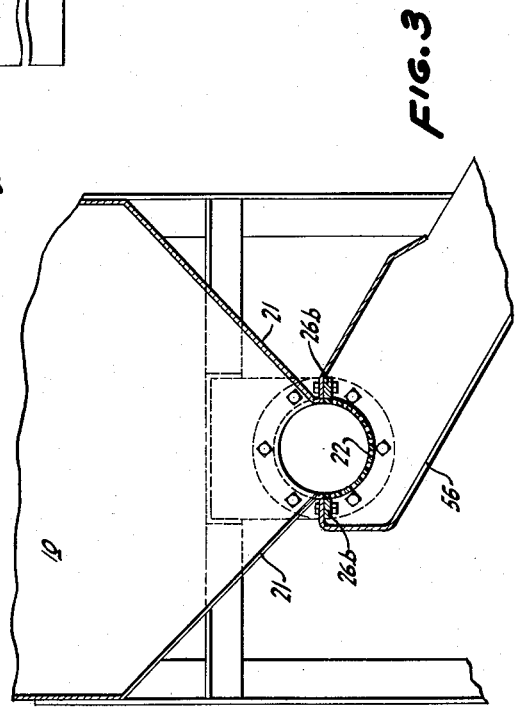
INVENTOR.
WILLIAM M. GALLOWAY
BY
ATTORNEYS Patented Dec. 22, 1953

2,663,381

UNITED STATES PATENT OFFICE 2,663,381

COTTON GIN TRASH DISPOSAL UNIT

William M. Galloway, Taft, Calif.

Application July 7, 1952, Serial No. 297,585

4 Claims. (Cl. 183—31)

The present invention relates to a waste disposal device and more particularly to a device for treating and disposing of cotton waste after it has been separated from the cotton as an incident to the ginning operation.

It has been the practice to blow the waste material separated from the cotton out of the gin into mechanical cyclones from which the waste is deposited by gravity into vehicles or onto the ground, although in some cases cyclones are not used and the waste is merely blown out into the open air and allowed to settle on the ground. Since the waste is highly imflammable, such practices create a fire hazard and amounts of dust are blown into the air sufficient to constitute a nuisance. In the area of extensive ginning operations, lint collects on power and telephone lines causing interferences with service.

The present invention contemplates a processing and disposal of the cotton gin waste which will not only avoid all of the objectionable features of these practices, but will render the recovered waste available for useful employment as a base for mixed stock feeds, a soil conditioner or mulch or a constituent of wallboard or other molded products. In summary, this is accomplished by conveying the waste-laden air stream from a cotton gin to the lower portion of a waste collector tank preferably provided with a plurality of baffles above the point of admission of the waste-laden air stream and essentially provided with water spraying means in the upper portion thereof. The water spray acts upon the waste thus introduced into the tank to saturate it, while the baffles decrease the velocity of the entrained waste particles, insuring that they will not exit from the open upper end of the tank prior to sufficient exposure to the water spray to effect saturation of all of the waste material. Saturated material is removed from the tank by a power operated conveyer communicating with a discharge hopper at the lower end of the tank. Means are provided for recovering and recirculating the water used to saturate the waste, which is important for the purposes of economy since the flow is of the order of 200 gallons per minute. It is also a factor in enriching waste destined for agricultural uses, since appreciable quantities of atmospheric nitrogen are picked up by the spray and added to the waste. In a modified form the device of the present invention includes means for conveying the waste from the discharge hopper which means compresses it sufficiently to substantially reduce its moisture content, recirculating the expelled water to the sprays.

The primary object of the invention is to provide an economical and efficient device for preventing airborne dispersion of cotton gin waste and recovering the same in useful form.

The novel features characterizing the present invention are defined with particularity in the appended claims. The invention itself, however, together with additional objects and advantages thereof will be best understood from the following description of a preferred embodiment of it, when read in connection with the accompanying drawings, in which:

Figure 1 is a view in side elevation of a waste disposal device embodying the present invention, a portion of the waste collector tank wall being broken away to disclose the interior thereof and certain of the controls for the power operated conveyer means being diagrammatically illustrated;

Figure 2 is a view in side elevation and partly in section of a modified form of conveyer means embodying features of the present invention;

Figure 3 is a fragmentary view in section of the lower portion of the waste collector tank of the modified form of Figure 2, illustrating the discharge hopper and a portion of the conveyer; said section being taken on the line 3—3 of Figure 2.

As shown in Figure 1, the device of the present invention comprises a waste collector tank 10 provided with means such as a duct 11 communicating with an opening 12 in the lower portion of the tank for admitting a waste-laden air stream to the lower portion thereof. The duct 11 is, of course, in operation of the device, connected to the discharge duct of a conventional form of cotton gin, so that substantially all of the waste discharged from the gin will be conveyed by an air stream to the lower portion of the collector tank. Intermediate the upper and lower portions of the tank, it is preferable to provide baffles, such as those illustrated at 13 and 14, to disperse the entering air stream and reduce its velocity so that entrained particles of waste will not be carried out of the tank too rapidly; the upper portion of the tank being, however, open at 15 so as to provide an air discharge port and avoid building up excessive pressures therein.

Adjacent the upper end of the tank 10 one or more spray heads 17 are provided to project a spray of water in a counter current with reference to the direction of travel of the waste-laden air stream toward the open upper end of the tank 16. The spray head or heads 17 are connected, as by a pipe 18, with a suitable source of water under pressure.

At the lower end of the tank 10 a discharge hopper 20 is formed, as by sloping inwardly the walls of the tank 10 at 21. Communicating with said discharge hopper is a power operated conveyer for removing saturated waste material from the hopper. This conveyer, in the illustrated embodiment of the invention, comprises a cylindrical element 22 secured to the discharge hopper by means such as bolts 25 passing through the lower edge portions of the hopper into annular flanges 26 welded to the periphery of the cylindrical element 22. The upper half of the cylindrical element 22 which is between the flanges 26 is cut away so that the lower portion 23 of element 22 between flanges 26 constitutes a bottom for the discharge hopper 20. The cylindrical element 22 has a packing gland 27 adjacent its left end, as viewed in Figure 1, which packing gland forms a working seal with a piston 28 reciprocable from the position in which it is shown in Figure 1 to a position adjacent the rightmost end of the cylindrical element 22 to push saturated waste on the hopper bottom 23 to the rightmost end of the cylindrical element 22, whence it will be conveyed by gravity, entrained water, and the push of material forced out behind it into a discharge tube 29 terminating in an open spout 30, whence it is discharged into a space defined by conventional checks from which the water may be recovered for recirculation.

Power operated means are provided for automatically causing repeated reciprocations of the piston 28. In the embodiment of the invention illustrated in the accompanying drawings, this means comprises an oscillatory motor 32 powered by a pump diagrammatically illustrated at 33, through a valve structure 34 including a rotatable element operable to alternately connect the discharge of the pump through lines 36 and 37 to the left end of the cylinder of the oscillatory motor 32 or through lines 36 and 38 to the right end of said cylinder. In the position in which the parts are shown, the outlet of the pump is connected to the left end of the cylinder 32 and the right end of said cylinder is connected by line 38 and line 39 to reservoir 40 which, through line 41, feeds the inlet side of the pump 33. When the connections are reversed to connect the output side of the pump 33 to the right end of the cylinder, the left end of the cylinder 32 is similarly connected, through lines 37 and 39, to the tank 40.

Means responsive to movement of the piston 28 are provided for producing repeated oscillations of the valving element 35 so as to cause repeated oscillations of the piston 28. As the piston 28 moves leftwardly to the position indicated in Figure 1, a projection 42 thereon closes a limit switch 43 having an electrical connection through line 44 with a conventional valve operating device indicated at 45 which acts through a mechanical connection indicated diagrammatically at 46 to oscillate the valve element 35 and reverse the connections controlled by it to the cylinder 32. Similarly, when the piston 28 moves to the right, the arm 42 closes a limit switch 48 as the rightmost end of the piston's travel is approached, closing a circuit 49 to the device 45 and again reversing the connections effected by the valving element 35. In order to prevent waste already discharged from the bottom of the hopper 20 by a rightward movement of the piston 28 from being sucked back during the leftward stroke of the piston, a check valve connected with an open air line, as indicated at 50, is disposed adjacent the rightmost end of the cylindrical element 22 at its upper side.

In situations where reduction of the water content of the waste is desirable, it is preferable to make at least a part of the cylindrical section 22 in the form of a foraminous section, as illustrated at 55 in Figure 2. In this construction a water collecting device 56 is supported on flanges 26 and 26a and side bars 26b below the section 55, as by bolts 57, and is provided with an outlet 58 to a settling tank 59 from which a pump 60 feeds it into the line 18 to the spray nozzle.

In operation the outlet of the cotton gin waste discharge is connected to the duct 11 feeding a waste-laden air stream into the collector tank 10 where it is watered down by the spray from the spray head 17 and collects in the hopper 20. After a sufficient amount of such saturated waste has collected, operation of the piston 28 by the motor 32 is initiated by closing the switch 47, causing the valve operator 45 to set the valve element 35 so as to connect the outlet of the pump 33 through lines 36 and 37 to the left end of the cylinder of the motor 32 and to connect the right end of said cylinder, through lines 38 and 39, to the tank 40 and thence through line 41 to the inlet side of the pump 33. This causes a rightward oscillation of the piston 28 discharging and compressing the waste, as previously described. As the piston 28 reaches the rightward extremity of its travel, it closes the limit switch 48, causing a reversal of the operation of the motor 32 and retracting the piston 28 to the position in which it is shown in Figure 1. During this operation air is admitted to the cylindrical element 26 through the check valve 50; said valve, however, being closed during all other operations. Operation of the device is arrested by opening the switch 47, it being noteworthy that the switch 47 is located in the line 44 so that operation of the piston 28 can never be arrested except when it is in its extreme leftward position and the hopper 20 is clear for the reception of waste. Alternatively, however, the valve element may be actuated manually, so that the piston 28 may be optionally arrested at the right end of its stroke, in which position it closes the bottom of tank 10.

It will be understood that the invention is not limited to the specific form of device illustrated and described herein, but that equivalents of the constructions disclosed may be substituted within the scope of the appended claims.

What is claimed is:

1. In a device of the class described including a vertically positioned waste collector tank having an air discharge port in the upper portion thereof and a discharge hopper in the lower end thereof, and means for admitting a waste laden air stream into the lower portion of said tank above said discharge hopper; the combination of means for removing waste material from the air stream comprising a series of baffles in said tank intermediate said discharge port and said admitting means, and water spraying means in the upper portion of said tank above said baffles, whereby the velocity of the waste material entrained in said air stream is substantially reduced in said tank by said baffles thereby permitting such waste material to be saturated and washed down into said discharge hopper by the water from said spraying means; and means for removing said washed down waste material and water from said hopper comprising a cylinder in peripheral communication with the lower portion of said hopper the axis of said cylinder being transverse to the vertical axis of said tank, said cylinder having a foraminous wall portion, a discharge member connected to one end of said cylinder, and a piston reciprocable within said cylinder and adapted to remove water from said waste material by compression thereof above said foraminous wall portion, and to simultaneously force said waste material in said cylinder into said discharge member.

2. In a device of the class described including a vertically positioned waste collector tank having an air discharge port in the upper portion thereof and a discharge hopper in the lower end thereof, and means for admitting a waste laden air stream into the lower portion of said tank above said discharge hopper; the combination of means for removing waste material from the air stream comprising a series of baffles in said tank intermediate said discharge port and said admitting means, and water spraying means in the upper portion of said tank above said baffles, whereby the velocity of the waste material entrained in said air stream is substantially reduced in said tank by said baffles thereby permitting such waste material to be saturated and washed down into said discharge hopper by the water from said spraying means; and means for automatically removing said washed down waste material and water from said hopper comprising a cylinder in peripheral communication with the lower portion of said hopper the axis of said cylinder being transverse to the vertical axis of said tank, said cylinder having a foraminous wall portion, a discharge member connected to one end of said cylinder, a piston reciprocable within said cylinder and adapted to remove water from said washed down waste material by compression thereof above said foraminous wall portion, and to simultaneously force said waste material in said cylinder into said discharge member, and means responsive to the movement of said piston in said cylinder for effecting repeated oscillations of said piston within said cylinder.

3. In a device of the class described including a vertically positioned waste collector tank having an air discharge port in the upper portion thereof and a discharge hopper in the lower end thereof, and means for admitting a waste laden air stream into the lower portion of said tank above said discharge hopper; the combination of means for removing waste material from the air stream comprising a series of baffles in said tank intermediate said discharge port and said admitting means, and water spraying means in the upper portion of said tank above said baffles, whereby the velocity of the waste material entrained in said air stream is substantially reduced in said tank by said baffles thereby permitting such waste material to be saturated and washed down into said discharge hopper by the water from said spraying means; and means for removing said washed down waste material and water from said hopper comprising a cylinder in peripheral communication with the lower portion of said hopper the axis of said cylinder being transverse to the vertical axis of said tank, a discharge member connected to one end of said cylinder, and a piston reciprocable within said cylinder and adapted to force waste material and water deposited in said cylinder into said discharge member.

4. In a device of the class described including a vertically positioned waste collector tank having an air discharge port in the upper portion thereof and a discharge hopper in the lower end thereof, and means for admitting a waste laden air stream into the lower portion of said tank above said discharge hopper; the combination of means for removing waste material from the air stream comprising a series of baffles in said tank intermediate said discharge port and said admitting means, and water spraying means in the upper portion of said tank above said baffles, whereby the velocity of the waste material entrained in said air stream is substantially reduced in said tank by said baffles thereby permitting such waste material to be saturated and washed down into said discharge hopper by the water from said spraying means; and means for removing said washed down waste material and water from said hopper comprising a cylinder in peripheral communication with the lower portion of said hopper the axis of said cylinder being transverse to the vertical axis of said tank, a discharge tube connected to one end of said cylinder, a piston reciprocable within said cylinder and adapted to force waste material and water deposited in said cylinder into said discharge tube, and valve means between the end of said cylinder and said discharge tube for preventing waste material in said tube from being sucked back into said cylinder when the piston is reciprocated in the opposite direction.

WILLIAM M. GALLOWAY.

References Cited in the file of this patent

UNITED STATES PATENTS

| Number | Name | Date |
|---|---|---|
| 582,791 | Kennedy | May 18, 1897 |
| 825,957 | Buckley | July 17, 1906 |
| 1,793,620 | Jacobus | Feb. 24, 1931 |
| 2,354,674 | Fisher | Aug. 1, 1944 |